United States Patent Office 3,363,016
Patented Jan. 9, 1968

3,363,016
ISOMERIZATION OF CYCLOOCTADIENE COMPOUNDS
Paul R. Stapp, Bartlesville, Okla., assignor to Phillips Petroleum Company, a corporation of Delaware
No Drawing. Filed May 25, 1964, Ser. No. 370,100
19 Claims. (Cl. 260—666)

This invention relates to the isomerization of cyclooctadiene compounds. In one aspect this invention relates to the preparation of $\Delta^2$-bicyclo-3,3,0-octene compounds by isomerizing cyclooctadiene compounds. In another aspect this invention relates to the preparation of 16 carbon cyclic polyene alkylation products of said cyclooctadiene compounds, said isomerized cyclooctadiene compounds, and hydrogenated derivatives thereof.

This application is a continuation-in-part of my copending application Ser. No. 259,374, filed Feb. 18, 1963 now abandoned.

In recent years, various processes have been developed for the production of cylodienes. For example, cis,cis-1,5-cyclooctadiene can be prepared by the dimerization of butadiene in the presence of various catalysts or by the reduction of the acetylene tetramer, cyclooctatetraene. Processes are known for the isomerization of cis,cis-1,5-cyclooctadiene to cis,cis-1,3-cyclooctadiene.

A number of tedious chemical syntheses have been proposed for synthesizing compounds containing the bicyclo-3,3,0-octene or octane structure. However, such methods involve many steps and are quite expensive and time consuming.

I have now discovered that compounds containing the bicyclo-3,3,0-octene structure can be prepared by isomerizing cyclooctadiene compounds. I have also discovered that concomitantly with said isomerization there are obtained 16 carbon cyclic polyene alkylation products of said cyclooctadiene, and also of said isomerized cyclooctadiene. Said 16 carbon polyene alkylation products can be hydrogenated to give derivatives of cyclooctane and bicyclo-octane, two of which are novel compounds. Thus, broadly speaking, the present invention resides in isomerizing a cyclooctadiene compound to a $\Delta^2$-bicyclo-3,3,0-octene compound by contacting said cyclooctadiene compound with an isomerization and alkylation catalyst isomerizing and alkylation conditions; recovering at least one of said $\Delta^2$-bicyclo-3,3,0-octene compound and said 16 carbon cyclic polyene alkylation products from the resulting reaction mixture; and said novel compounds.

An object of this invention is to provide a process for isomerizing cyclooctadiene compounds to $\Delta^2$-bicyclo-3,3,0-octene compounds. Another object of this invention is to provide a process for preparing $\Delta^2$-bicyclo-3,3,0-octene compounds. Another object of this invention is to provide a process for preparing 16 carbon cyclic polyene alkylation products of cyclooctadiene compounds. Another object of this invention is to provide a process for preparing 16 carbon cyclic polyene alkylation products of said $\Delta^2$-bicyclo-3,3,0-octene compounds. Still another object of this invention is to provide novel compounds which are hydrogenated derivatives of said 16 carbon cyclic polyene alkylation products. Other aspects, objects, and advantages of the invention will be apparent to those skilled in the art in view of this disclosure.

Thus, according to the invention, there is provided a process for isomerizing a cyclooctadiene to a cis-$\Delta^2$-bicyclo-3,3,0-octene containing the same number of carbon atoms and hydrogen atoms as said starting cyclooctadiene, which process comprises: contacting said cyclooctadiene under isomerizing conditions in an isomerization zone with an isomerization catalyst capable of effecting said isomerization; and recovering said bicyclooctene.

Further according to the invention, there is provided a process for preparing at least one of a cis-$\Delta^2$-bicyclo-3,3,0-octene, a cyclooctenyl-$\Delta^2$-cis-bicyclo-3,3,0-octene, an octadienyl-cis-$\Delta^2$-bicyclo-3,3,0-octene, and a cyclooctenyl-1,3-cyclooctadiene, which process comprises: contacting a cyclooctadiene hydrocarbon in a reaction zone under isomerizing and alkylation conditions with an isomerization and alkylation catalyst capable of effecting conversion of said cyclooctadiene to said above-named product compounds; and recovering at least one of said above-named product compounds from the resulting mixture.

Still further according to the invention, there is provided a novel cyclooctenyl-cis-$\Delta^2$-bicyclo-3,3,0-octene, a novel octadienyl-cis-$\Delta^2$-bicyclo-3,3,0-octene, and a novel cyclooctenyl-1,3-cyclooctadiene prepared by the process of the preceding paragraph.

Still further according to the invention, there are provided as new compositions of matter, the compounds 4-cyclooctyl-cis-bicyclo-3,3,0-octane,
4-n-octyl-cis-bicyclo-3,3,0-octane.

Suitable isomerization and alkylation catalysts which can be employed in the practice of the invention include elemental potassium, elemental rubidium, elemental cesium, and compounds characterized by the formula

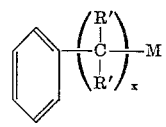

wherein: M is an alkali metal selected from the group consisting of potassium, sodium, rubidium, and cesium, $x$ is an integer of from 0 to 1, and each R' is selected from the group consisting of a hydrogen atom and a methyl group.

Examples of said isomerization and alkylation catalysts represented by the above formula which can be employed in the practice of the invention include, among others, the following: phenylpotassium; phenylsodium; phenylcesium; phenylrubidium; benzylpotassium; benzylsodium; α-methylbenzylrubidium; α-methylbenzylpotassium; α,α-dimethylbenzylpotassium; α,α-dimethylbenzylcesium; and the like.

The preferred catalysts of the above formula are those wherein $x$ is 0, and M is either potassium or sodium. Thus, phenylsodium and phenylpotassium are the presently preferred catalysts, with phenylpotassium being the presently most preferred catalyst. With respect to the above-named elemental metals, potassium is presently the most preferred catalyst.

Said isomerization and alkylation catalysts which can be employed in the practice of the invention can be prepared by any suitable method known to those skilled in the art. A variety of methods are available. For example, phenylpotassium can be readily prepared by the reaction of anisole with elemental potassium at elevated temperatures. A reaction mixture of amyl chloride, benzene, and elemental sodium will yield phenylsodium. Cleavage of diphenylmercury with elemental potassium will yield phenylpotassium. Phenylpotassium can also be prepared by the low temperature reaction of chlorobenzene with elemental potassium. Phenylsodium can also be prepared by the reaction of elemental sodium with chlorobenzene. Similar reactions can be employed to form the catalyst compounds of the above formula which contain rubidium and cesium.

In the practice of the invention said isomerization and alkylation catalysts are usually employed in an amount which is within the range of from 1 to 15 weight percent of the starting cyclooctadiene compound. It is, however, within the scope of the invention to employ amounts of said catalysts outside of said range.

The isomerization reaction and alkylation reactions of the invention can be carried out in the presence of a diluent, if desired. The presence of a diluent in the reaction zone is not essential as is shown by the examples given hereinafter. However, if one desires to employ a diluent, the diluent chosen should be inert with respect to the materials which are present in the reaction zone. Suitable diluents which can be employed in the practice of the invention include the saturated acyclic and alicyclic hydrocarbons, for example, n-pentane, n-heptane, isooctane, cyclohexane, methylcyclohexane, and decalin. Generally, the amount of dilutent employed will not exceed about 90 weight percent of the reaction mixture.

The isomerization reaction and alkylation reactions of the invention are generally carried out at a temperature within the range of from 125 to 250° C. The reaction time, while not critical, will be governed by such factors as catalyst ratio and temperature, and will generally be in the range of from 1 to 50 hours, more generally in the range of from 6 to 24 hours. The reactions are carried out under liquid phase conditions, in many instances at atmospheric pressure. However, superatmospheric pressures can be employed to maintain said liquid phase conditions if necessary. When superatmospheric pressures are employed, the pressure will generally be the autogenous pressure of the reaction mixture at the reaction temperature. This pressure can vary widely, but will generally be in the range of from 50 to 100 p.s.i.

Cyclooctadienes which can be isomerized to $\Delta^2$-bicyclo-3,3,0-octenes and otherwise reacted in accordance with the invention include those represented by the following formulas:

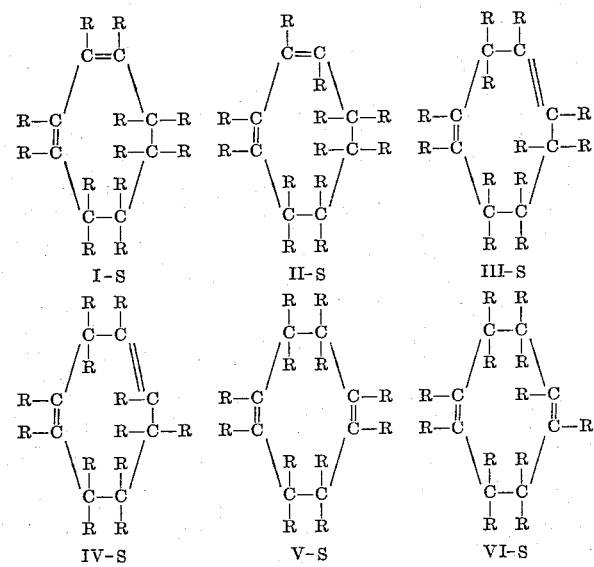

wherein: each R is selected from the group consisting of a hydrogen atom and alkyl, aryl, aralkyl, alkaryl, and cycloalkyl radicals containing from 1 to 8 carbon atoms inclusive, at least 8 of said R substituents are hydrogen, and at least 1 of said R substituents is a hydrogen atom located in an allylic position, i.e., attached to a carbon atom adjacent to a carbon atom which is attached to another carbon atom by a double bond.

The above Formulas I-S to VI-S inclusive are intended to include all present known forms of the represented cyclooctadiene compounds containing double bonds in the 1,3-; 1,4-; and 1,5- positions, including the cis,cis- and cis,trans-forms. So far as this applicant is now aware, the trans-trans-form of said cyclooctadienes does not exist. However, if said trans,trans-form does exist, there is no known reason why it would not react or isomerize in the same manner as the other known forms. Thus, herein and in the claims, unless otherwise specified, the words "cyclooctadiene" and "cyclooctadienes" are employed generically and are intended to include all forms of the cyclooctadienes represented by the above Formulas I-S to VI-S inclusive.

Examples of said cyclooctadienes which can be isomerized and otherwise reacted in accordance with the invention include, among others, the following:

1,3-cyclooctadiene;
1,4-cyclooctadiene;
1,5-cyclooctadiene;
1-methyl-1,3-cyclooctadiene;
1-phenyl-1,5-cyclooctadiene;
1,5-diethyl-1,5-cyclooctadiene;
3,4-di-n-propyl-1,5-cyclooctadiene;
2,6-diisobutyl-1,3-cyclooctadiene;
2,5-diphenyl-1,5-cyclooctadiene;
2,5,7-tri-n-hexyl-1,5-cyclooctadiene;
3,4-dicyclohexyl-1,5-cyclooctadiene;
2,5,7-tribenzyl-1,5-cyclooctadiene;
3,4-di(2-phenylethyl)-1,4-cyclooctadiene;
2,6-di-n-octyl-1,3-cyclooctadiene;
3,7-di(4-ethylphenyl)-1,5-cyclooctadiene;
1,2,5,6-tetramethyl-1,5-cyclooctadiene;
1,6-dicyclooctyl-1,3-cyclooctadiene;
1,2,5,6-tetraphenyl-1,4-cyclooctadiene; and
1,2,5,6-tetra-n-octyl-1,5-cyclooctadiene.

The compounds of the above Formulas I-S to VI-S inclusve which are preferred are the cyclic dimers obtainable by dimerization of butadiene, isoprene and piperylene and the isomers obtainable by isomerization of the double bonds of these cyclic dimers. For example, 1,3-cyclooctadiene;
1,5-cyclooctadiene;
1,4-cyclooctadiene;
1,5-dimethyl-1,5-cyclooctadiene;
2,5-dimethyl-1,5-cyclooctadiene;
3,4-dimethyl-1,5-cyclooctadiene;
3,7-dimethyl-1,5-cyclooctadiene;
1,5-dimethyl-1,3-cyclooctadiene;
2,6-dimethyl-1,3-cyclooctadiene;
2,5-dimethyl-1,3-cyclooctadiene;
1,6-dimethyl-1,3-cyclooctadiene;
1,2-dimethyl-1,3-cyclooctadiene; and
5,6-dimethyl-1,3-cyclooctadiene, are preferred feedstocks for the isomerization and alkylation process of this invention.

When one of the above-described cyclooctadiene compounds is isomerized in accordance with the invention, the product which is obtained is a cis-$\Delta^2$-bicyclo-3,3,0-octene compound containing the same number of carbon atoms and hydrogen atoms as the starting cyclooctadiene compound. Said cis-$\Delta^2$-bicyclo-3,3,0-octene compounds can be represented by the following formula:

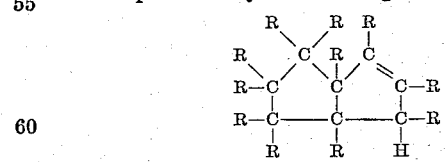

wherein each R is selected from the group consisting of a hydrogen atom, and alkyl, aryl, aralkyl, alkaryl, and cycloalkyl radicals containings from 1 to 8 carbon atoms inclusive, and at least 7 of said R substituents are hydrogen.

Since the cis,cis-form of the above-described cyclooctadienes is the most stable form, the isomerization product obtained in the practice of the invention is a cis-$\Delta^2$-bicyclo-3,3,0-octene, even when a cis,trans-cyclooctadiene starting material is used, and even though some of the trans-$\Delta^2$-bicyclo-3,3,0-octene isomer may be formed as an intermediate product.

In one presently preferred method for carrying out the isomerization reaction and alkylation reactions of the invention, the isomerization and alkylation catalyst is prepared in situ. For example, an alkali metal such as potassium is cut into small pieces. Said metal, anisole, and the cyclooctadiene compound to be isomerized and otherwise reacted are charged to a suitable reaction vessel provided with stirring means. Said vessel is then preferably purged with nitrogen before closing. Heat is then applied and the reaction vessel is maintained at the desired temperature, with stirring, for the desired reaction time. The isomerizate, comprising the corresponding cis-$\Delta^2$-bicyclo-3,3,0-octene compound, and the alkylate, comprising the 16 carbon cyclic polyenes, are then recovered from the resulting reaction mixture.

In another method for carrying out the isomerization reaction and alkylation reactions in accordance with the invention, and wherein the catalyst is prepared in situ, a mixture of a metal such as potassium and the cyclooctadiene to be isomerized and otherwise reacted is charged to a suitable reaction vessel provided with stirring means. Said mixture is warmed slowly to melt the metal after which the stirrer is started and a solution of anisole and additional cyclooctadiene compound is added slowly. After the addition of said last-mentioned solution is complete, the reaction mixture is refluxed at normal reflux temperature for the desired reaction time, and the isomerizate, comprising the corresponding cis-$\Delta^2$-bicyclo-3,3,0-octene compound, and the alkylate, comprising the 16 carbon cyclic polyenes, are then recovered from the resulting reaction mixture.

In still another method, the isomerization and alkylation catalyst is prepared in situ by cleavage of a suitable compound containing a phenyl group. In this method, for example, a suitable reaction vessel provided with stirring means is charged with diphenylmercury, potassium, and normal hexane. The resulting mixture is heated to a moderate temperature, e.g., 65° C., the stirrer started, and the cyclooctadiene compound to be isomerized and otherwise reacted is then slowly added. After the addition of the cyclooctadiene compound is complete, the reaction mixture is refluxed at its normal refluxing temperature for the desired reaction time. After cooling, the isomerizate, comprising the cis-$\Delta^2$-bicyclo-3,3,0-octene corresponding to the starting cyclooctadiene, and the alkylate, comprising the 16 carbon cyclic polyenes, are recovered from the resulting reaction mixture.

In still another method, elemental potassium is employed as the isomerization and alkylation catalyst and is charged along with the cyclooctadiene compound to be isomerized and otherwise reacted into a suitable reaction vessel provided with stirring means. The mixture is then refluxed with stirring for the desired reaction time and, after cooling, the isomerizate, comprising the cis-$\Delta^2$-bicyclo-3,3,0-octene corresponding to the starting cyclooctadiene, and the alkylate, comprising the 16 carbon cyclic polyenes, are recovered from the resulting reaction mixture.

If desired, the isomerization and alkylation catalyst employed in the practice of the invention can be prepared prior to actual use. For example, in another method in accordance with the invention, phenylsodium, commercially available as a 25 weight percent suspension in normal hexane, is charged to a suitable reaction vessel and the cyclooctadiene compound to be isomerized and otherwise reacted is added thereto slowly. The resulting mixture is then refluxed for the desired reaction time and, after cooling, the isomerizate, comprising the cis-$\Delta^2$-bicyclo-3,3,0-octene corresponding to the starting cyclooctadiene, and the alkylate, comprising the 16 carbon cyclic polyenes, are recovered from the resulting reaction mixture.

At the end of the reaction time in all of the above methods, the cis-$\Delta^2$-bicyclo-3,3,0-octene product and the 16 carbon cyclic polyene products can be recovered by such methods as distillation, gas chromatography, and the like. Any suitable method for the recovery of said products can be employed. Unconverted cyclooctadiene compound can be recycled to the isomerization zone.

The following examples will serve to further illustrate the invention.

EXAMPLE I

In this run, 7.8 grams of potassium, 10.8 grams of anisole and 200 ml. of n-heptane were charged to a 1-liter stirred autoclave. A solution of 65 grams of cis,cis-1,5-cyclooctadiene in 100 ml. of n-heptane was then added, and the autoclave was pressured with 70 grams of propylene. The mixture was then heated while stirring at 175° C. for 22 hours, after which the temperature was raised to 200° C. and maintained at that temperature for 6 hours. No pressure drop was observed.

After cooling, the autoclave was opened, the phenylpotassium catalyst was decomposed with methanol, and the dark tarry solution was washed several times with water and dried over magnesium sulfate. Vapor phase chromatographic analysis on a 25-foot silicone column showed 6 major peaks.

*Chromatographic analysis*

Unchanged 1,5 - cyclooctadiene—7.6 grams=12% of starting COD.[1]
Compound A—2 grams=3%.[2]
1,3-cyclooctadiene—1.3 grams=2%.[2]
Compound B—32.6 grams=50%.[2]
Compound C—3.2 grams=5%[2] (same retention time as vinyl cyclohexene).
Compound D—0.09 grams.

[1] Cyclooctadiene.
[2] Based on starting COD.

The material was then carefully fractionated through a 1″ x 15″ column packed with stainless steel packing.

FRACTIONATION

| Fractions | Boiling Point, °C. | Ml. | Weight, grams |
|---|---|---|---|
| 1 | 94–103 | 19.7 | *13.5 |
| 2 | 103–128 | 3.6 | 2.7 |
| 3 | 128–131 | 9.4 | 8.3 |
| 4 | 131–132 | 16.2 | 14.5 |
| 5 | 132–133 | 11.0 | 10.0 |
| 6 | 133–140 | 3.5 | 2.7 |
| 7 | 140–146 | 5.6 | 4.6 |
| 8 | Pot Residue | | ca. 10 |

* Primarily heptane.

Fractions 3–5 from the above fractionation were analyzed by vapor phase chromatography and found to contain approximately 85 percent by weight of Compound B. These fractions were combined and carefully fractionated at a 100/1 reflux ratio in a 15″ Podbielniak column. A total of 8 cuts containing from 2.1 to 6.0 ml. each were taken in this second fractionation. The last three cuts contained greater than 90 percent of Compound B. No cyclooctadiene was present in any of these last three cuts.

Said last three cuts were combined and a sample thereof analyzed for carbon and hydrogen.

*Elemental analysis.*—Calculated for $C_8H_{12}$: C, 88.82; H, 11.18. Found: C, 88.5; H, 10.9.

Other samples of said combined last three cuts were subjected to mass spectra analysis, nuclear magnetic resonance analysis, and infrared analysis. Mass spectra results showed a molecular weight of 108 while nuclear magnetic resonance spectra indicated the compound to be either $\Delta^7$-bicyclo-4,2,0-octene or $\Delta^2$-bicyclo-3,3,0-octene. The infrared spectrum had an olefin frequency at approximately 1610 cm.$^{-1}$ and a band at 700 cm.$^{-1}$ which, in general, corresponds to a cyclopentane ring. The spectrum was not identical with that of $\Delta^7$-bicyclo-4,2,0-octene when compared with the one given in J. Am. Chem. Soc. 83, 3411 (1961). The infrared spectrum was identical with that of cis-$\Delta^2$-bicyclo-3,3,0-octene when compared to the one shown by Germain and Blanchard in Bull. soc. chim. France, 473 (1960).

Another sample from the above second fractionation, amounting to 4.8 ml. and containing about 76 percent of Compound B contaminated with 18 percent of Compound C and 6 percent of Compound D was submitted to quantitative hydrogenation in 3 different runs.

QUANTITATIVE HYDROGENATION

| Sample Weight, grams | Hydrogen volume, ml. | Calculated Double Bonds |
|---|---|---|
| 1.0685 | 309.1 | 1.205 |
| 0.6283 | 174.4 | 1.160 |
| 0.8088 | 236.8 | 1.220 |

The combined hydrogenation runs were filtered to remove the catalyst, diluted with water and extracted with pentane. The pentane extracts were washed with saturated aqueous sodium bicarbonate solution, then with water, and dried over magnesium sulfate. Vapor phase chromatographic analysis showed three major peaks in approximately the same ratio as the starting material hydrogenation runs, indicating that three different ring systems were present. The hydrogenation data above correspond almost exactly to Compound C being a diene.

In another hydrogenation run, a sample of said combined last three cuts which contained greater than 90 percent of Compound B was reduced over a platinum catalyst. In this run, a 0.6766 gram sample of Compound B concentrate was subjected to quantitative microhydrogenation over platinum catalyst in acetic acid. A total of 165.7 ml. of hydrogen was taken up at 749 mm. and 25° C. The theoretical amount of hydrogen for one double bond is 162.5 ml. The catalyst was then removed by filtration, and the solution was poured into water and extracted with pentane. The pentane extracts were washed with saturated aqueous sodium bicarbonate solution, then with water, and dried over magnesium sulfate. After filtration, the pentane was evaporated off and 0.6 grams of cis-bicyclo-3,3,0-octane was obtained whose infrared spectrum was identical with that of a published spectrum for this compound [Bull. soc. chim. France, 473 (1960)].

EXAMPLE II

In another run, 15.6 grams of potassium, 21.6 grams of anisole and 265 grams of cis,cis-1,5-cyclooctadiene were charged to a 1-liter stirred autoclave. The autoclave was purged with nitrogen, sealed, and heat was applied. The mixture was maintained at 200° C. for 16 hours with stirring, after which the mixture was cooled, the reactor was opened and the catalyst was decomposed with methanol. The liquid was washed thoroughly with water, the washings were extracted with pentane, and the combined organic layers were dried over magnesium sulfate. The pentane was removed by distillation, and the residue was distilled through a short path still. A total of 210 grams of material boiling from 126–152° C. was obtained. A total of 30 grams higher boiling residue remained in the kettle. Vapor phase chromatographic analysis of a sample from the 210 grams of overhead showed it to contain 7 major components as well as at least 5 trace components.

*Chromatographic analysis*

| Component: | Weight percent |
|---|---|
| Unchanged 1,5-cyclooctadiene | 19.3 |
| Compound A | 3.2 |
| 1,3-cyclooctadiene | 16.5 |
| $\Delta^2$-bicyclo-3,3,0-octene | 53.6 |
| Compound C | 3.8 |
| Compound D | 1.7 |
| Compound E | 1.3 |

EXAMPLE III

Another run was carried out by the method of Example II except that the charge used was 23.4 grams of potassium, 32.4 grams of anisole and 265 grams of cis,cis-1,5-cyclooctadiene. When the temperature reached 200° C. in the autoclave, it was necessary to utilize an air stream for cooling to maintain the temperature below 225° C. due to the exothermic reaction which was occurring. After the exothermic reaction had subsided, the autoclave was maintained for 6 hours at 200° C. and was then allowed to cool overnight. The catalyst was decomposed and the product recovered by the method employed in Example II. Distillation yielded 216 grams of material, boiling range 130–156° C. and 26 grams of residue. Analysis of the overhead product by vapor phase chromatography showed it to be quite similar to the product from Example II.

*Chromatographic analysis*

| Component: | Weight percent |
|---|---|
| Unchanged 1,5-cyclooctadiene | 31.5 |
| Compound A | 4.6 |
| 1,3-cyclooctadiene | 5.9 |
| $\Delta^2$-bicyclo-3,3,0-octene | 47.4 |
| Compound C | 6.3 |
| Compound D | 2.6 |
| Compound E | 1.8 |

EXAMPLE IV

The overhead products from Examples II and III were combined and carefully fractionated through a ½" Todd column packed with stainless steel packing. Seventeen cuts ranging from 116° C. to 151° C. were taken. Of the 426 grams of starting material, a total of 240 grams of the material boiled from 130 to 133.5° C. From this fractionation, a sample of the higher boiling material, amounting to 77.8 grams and boiling from 143° to 149° C. was subjected to quantitative hydrogenation. This sample, containing approximately 47 weight percent each of 1,5-cyclooctadiene and 1,3-cyclooctadiene and approximately 5 percent of Compound A was subjected to quantitative hydrogenation at 740 mm. pressure and 27° C. over a platinum catalyst in acetic acid. One sample, amounting to 2.510 grams, took up 114.4 ml. of hydrogen, corresponding to 1.88 double bonds. A second sample, amounting to 0.1900 gram took up 93 ml. of hydrogen, corresponding to 2.00 double bonds.

An additional 1.9 grams of the mixture was hydrogenated in the same flask, and the saturated hydrocarbons obtained were extracted into pentane and washed in the manner previously described in Example I. Vapor phase chromatographic analysis after evaporation of the pentane showed only 1 major peak along with traces of bicyclic compounds. This shows that compound A has been reduced to a compound having the same retention time as cyclooctane. (Said compound A was subsequently identified as cyclooctene.)

EXAMPLE V

In another run, cis,cis-1,3-cyclooctadiene was prepared by isomerization of cis,cis-1,5-cyclooctadiene, after which the 1,3-cyclooctadiene was converted to cis-$\Delta^2$-bicyclo-3,3,0-octene according to the method of this invention.

In the isomerization of 1,5-cyclooctadiene to 1,3-cyclooctadiene, the procedure of Arnet and Pettit, J. Am. Chem. Soc. 83, 2955 (1961), was used. Into a flask equipped with a 15" x 1" column packed with stainless steel packing and a thermometer, there was placed 490 grams (600 ml.) of cis,cis-1,5-cyclooctadiene and 35 grams of iron carbonyl. Heat was applied, and the solution was maintained for 7 hours at 110–120° C. while periodically removing small portions for examination by vapor phase chromatography. At the end of this time, about 25 percent of the material had been converted to the 1,3 isomer. An additional 17.5 grams of iron carbonyl was added and the solution was maintained at 85–100° C. for 16 hours. Isomerization was still only about 60 percent complete, so the temperature was raised to 135° C. for 8 hours and thereafter allowed to stand overnight.

Vapor phase chromatographic analysis showed that the isomerization was completed, so the material was then fractionated, 450 grams of cis,cis-1,3-cyclooctadiene, boiling point 143–144° C. was obtained.

The cis,cis-1,3-cyclooctadiene was then isomerized to cis-$\Delta^2$-bicyclo-3,3,0-octene in the following manner. To a 1-liter stirred autoclave there was charged 15.6 grams of potassium, 21.6 grams of anisole and 265 grams of cis,cis-1,3-cyclooctadiene. The autoclave was flushed with nitrogen, sealed, and heated at 200° C. for 18 hours. After cooling, the catalyst was destroyed with methanol, the mixture was treated with water, the layers were separated, and the aqueous layer was extracted with pentane. The combined organic layers were then washed with water and dried over magnesium sulfate. The pentane was evaporated off, and the residue was distilled, yielding 171 grams of material boiling at 122–134° C. and 45 grams of higher boiling residue. Vapor phase chromatographic analysis of the distillate showed that it contained 95 percent (162 grams) of bicyclic compounds and 5 percent (9 grams) of unchanged 1,3-cyclooctadiene. The bicyclic compounds contained 98 percent of cis-$\Delta^2$-bicyclic-3,3,0-octene as identified below and approximately 2 percent of cis-bicyclo[3,3,0]octane. This represents a 96.6 percent conversion of 1,3-cyclooctadiene and a 63 percent ultimate yield of $\Delta^2$-bicyclo-3,3,0-octene.

Distillation of said distillate yielded a pure compound having a boiling point of 132–133° C. and a refractive index $n_D^{20}$ of 1.4750. This compares with the properties for cis-$\Delta^2$-bicyclo-3,3,0-octene given in Bull. soc. chim. France, 473 (1960), boiling point 131–132° C. and $n_D^{20}$ of 1.4760.

EXAMPLE VI

A sample of the fractionated $\Delta^2$-bicyclo-3,3,0-octene material from Example IV, boiling point 131–132° C., was subjected to oxidation according to the procedure of Dauben [Journal of Organic Chemistry, 27, 1910 (1960)]. In this run, a solution containing 12.84 grams of sodium metaperiodate, 0.26 gram of potassium permanganate and 0.51 gram of potassium carbonate in 400 ml. of water was made up. To this solution was added 1.11 grams of the cis-$\Delta^2$-bicyclo-3,3,0-octene from Example IV. The mixture was stirred at room temperature for 19 hours, during which time the color changed from purple to brick red. The mixture was then acidified with 15 percent aqueous sulfuric acid and continuously extracted with ether for 20 hours. The ether extract was dried over magnesium sulfate and evaporated, leaving approximately 0.5 gram of viscous oil. This oil was dissolved in saturated aqueous sodium bicarbonate solution, extracted with ether, and acidified to Congo Red wi h 15 percent aqueous sulfuric acid. The aqueous solution was then extracted with ether for 24 hours, and the ether layer was dried overnight over magnesium sulfate. The solution was filtered, and the ether was evaporated under reduced pressure leaving a pale gummy material which solidified. This material was dissolved in a small amount of water, the solution was filtered and saturated with hydrogen chloride. After 2 days in the freezer, the resulting light yellow crystals were collected, washed with cold pentane and air dried. This material had a melting point of 90–91° C. which compares to the 89° C. literature melting point for cis-2-carboxycyclopentaneacetic acid as given by Linstead and Mead in J. Chem. Soc., 935 (1934). Elemental analysis of this material showed it to contain 55.8 weight percent carbon and 7.1 weight percent hydrogen which compares with the values calculated for $C_8H_{12}O_4$ of 55.8 weight percent carbon and 7.02 weight percent hydrogen.

EXAMPLE VII

In an independent synthesis, cis-2-carboxycyclopentaneacetic acid was prepared and compared with the material from the oxidation step of the preceding example. In the first step of the independent synthesis, ethyl 2-carbethoxy-$\Delta^1$-cyclopentenylcyanoacetate was prepared by the procedure of Kon and Nangi, J. Chem. Soc. 2426 (1932). In this run, a mixture of 100 grams of 2-carbethoxycyclopentanone, 68 grams of ethyl cyanoacetate and 20 drops of piperidine was allowed to stand at room temperature for 2 days in a stoppered flask. The mixture was then warmed for 3.5 hours at 90° C. and allowed to stand overnight. The mixture was then diluted with an equal volume of ether after which the solution was washed with dilute HCl, then with water and was dried over magnesium sulfate. After removal of the ether by evaporation, the resdiue was distilled, yielding 94.8 grams of unchanged starting material and 34.2 grams of product boiling 115.5–118.5° C. at 0.3 mm. mercury absolute pressure. This material had a refractive index $n_D^{20}$ of 1.4878. Elemental analysis of this material gave the following results:

*Elemental analysis.*—Calculated for $C_{13}H_{17}O_4N$: C, 62.13; H, 6.82; N, 5.57. Found: C, 61.8; H, 6.8; N, 5.6.[1]

The above-prepared ethyl-2-carbethoxy-$\Delta^1$-cyclopentenylcyanoacetate was hydrogenated to cis-ethyl 2-carbethoxycyclopentylcyanoacetate. In this run, a Parr hydrogenation apparatus was charged with approximately 0.05 gram of platinum oxide catalyst and 25 ml. of 95 percent ethanol. The bomb was shaken at 50 p.s.i.g. hydrogen pressure until the catalyst was reduced, after which a solution of 23.0 grams of the above-prepared ethyl 2-carbethoxy-$\Delta^1$-cyclopentenylcyanoacetate in 50 ml. of 95 percent ethanol was charged to the hydrogenation apparatus. The apparatus was then pressured to 51 p.s.i.g. and shaken at room temperature for 2 hours and 5 minutes, at which time the pressure had dropped to 43 p.s.i.g. The bomb was allowed to stand overnight, after which the hydrogen was vented and the catalyst was removed by filtration. The catalyst was washed with ethanol and the washings were added to the ethanol solution from the hydrogenation. The ethanol was evaporated on a rotary evaporator, and an infrared spectrum of the remaining material showed that hydrogenation was incomplete. The mixture was again subjected to hydrogenation in a microhydrogenation apparatus until no more hydrogen was absorbed. The platinum catalyst was filtered out, and the ethanol was removed by evaporation. An infrared spectrum of the product showed that hydrogenation was substantially complete. This material was then used directly in the next phase of the independent synthesis.

The crude cis-2-carbethoxycyclopentylcyanoacetate was saponified and decarboxylated by the method of Linstead and Mead [J. Chem. Soc., 935 (1934)]. The crude product was boiled gently for 4 hours with concentrated hydrochloric acid, cooled and filtered. The light yellow filtrate was evaporated to dryness under reduced pressure, and the resulting solid was treated with 100 ml. of ether and allowed to stand overnight. The ether solution was decanted and evaporated to dryness under reduced pressure. The resulting light yellow crystals, amounting to 7 grams, melted at 63–70° C. A small sample (2.5 grams) was purified by dissolving in the least amount of warm water, filtering and saturating with hydrogen chloride. After standing overnight in the freezer, the resulting crystals were collected, washed with cold pentane and air dried. This material melted at 82–86° C. Repetition of the above treatment followed by vacuum drying over $P_2O_5$ yielded a material having a melting point of 85–87° C. The melting point of this material was not depressed when mixed with the diacid from the oxidation step of Example VI. The infrared spectra of the two materials were superimposable.

EXAMPLE VIII

In this run a reaction apparatus consisting of a 500 ml. Morton flask fitted with a stirrer, a thermometer, a

---

[1] Two nitrogen analyses were run, in one case analyzing 5.7 weight percent nitrogen, and in the other analyzing 5.5 weight percent nitrogen.

reflux condenser and a dropping funnel was employed. A mixture of 7.8 grams (0.2 gram atom) of potassium and 100 ml. of cis,cis-1,3-cyclooctadiene was charged to the reaction apparatus and warmed slightly to melt the potassium. After the potassium had melted, the stirrer was started, and a solution of 10.8 grams (0.1 mol) of anisole in 25 ml. of cis,cis-1,3-cyclooctadiene was added dropwise to the reaction flask at 80–90° C., and after addition was complete, the mixture was stirred at this temperature for 45 minutes. Additional heat was applied, and the mixture started to turn dark at 110° C. and started to reflux at 138° C. The mixture was refluxed for 20 hours, after which the mixture was cooled, and the catalyst was decomposed by adding 50 ml. of methanol dropwise. At this time, 100 ml. of n-pentane was added, followed by 100 ml. of water. The layers were separated, the organic layer was washed with water, dried over magnesium sulfate, filtered and distilled. 76.5 grams of material boiling in the octene range was obtained, and 11.0 grams of heavier material, boiling 98–122° C. at 0.1 mm. mercury absolute pressure was obtained. In addition, 6.6 grams of residue remained. The results of this run are given below in Table I.

EXAMPLE IX

In this run phenylpotassium was employed as the isomerization catalyst as in the preceding run, except that the phenylpotassium was prepared by the cleavage of diphenylmercury. In this run the apparatus of the preceding run was charged with 17.7 grams (0.05 mol) of diphenylmercury, 4.3 grams (0.11 gram atom) of potassium and 100 ml. of n-hexane. Heat was applied, and when the pot temperature reached 65° C., the stirrer was started. The diphenylmercury started to cleave almost immediately, and the mixture turned black. While heating was continued, 200 ml. of cis,cis-1,3-cyclooctadiene was added dropwise. During the addition of the cyclooctadiene, n-hexane was distilled out through an adapter. A total of 88 grams of the hexane solution was distilled out, and vapor phase chromatography analysis showed that it contained 25.9 grams of cyclooctadiene. Thus, the total amount of cyclooctadiene remaining in the flask was 148.5 grams. The pot temperature was 132° C., and refluxing and stirring was continued for 6 hours at which time a sample was subjected to vapor phase chromatographic analysis. This analysis showed the isomerization to be substantially complete. After cooling to approximately room temperature, the catalyst was destroyed by the addition of ethanol, and the resulting mixture was poured into water and extracted several times with pentane. The combined pentane extracts were washed with water, dried over magnesium sulfate and filtered. Distillation of the resulting material was carried out, the results of which are shown below in Table I.

EXAMPLE X

In this run the apparatus of the preceding Examples VIII and IX was employed for the isomerization of cis,cis-1,3-cyclooctadiene with elemental potassium. In this run a mixture of 125 ml. (108.5 grams) of cis,cis-1,3-cyclooctadiene and 3.9 grams (0.1 gram atom) of elemental potassium was refluxed with vigorous stirring under nitrogen for 7 hours. The mixture was then cooled and allowed to stand at room temperature overnight. After destruction of the catalyst with ethanol and extraction as in the previous examples, the product was distilled, resulting in the recovery of substantial quantities of cis-$\Delta^2$-bicyclo-3,3,0-octene. The results of this run are given below in Table I.

EXAMPLE XI

In this run phenylsodium was employed for the isomerization of cis,cis-1,3-cyclooctadiene according to the process of this invention. In this run, the apparatus of the preceding Examples VIII–X was employed, using an adapter between the condenser and flask. In this run, approximately 25 grams of phenylsodium was charged to the reaction zone as a suspension in n-heptane (a commercially available suspension). The stirrer was started, and 200 ml. of cis,cis-1,3-cyclooctadiene was added slowly to the dropping funnel while heptane was distilled out through the adapter. When the pot temperature reached 140° C., the heptane takeoff was stopped. Vapor phase chromatographic analysis of the heptane distillate showed that it contained 51.8 grams of cis,cis-1,3-cyclooctadiene, leaving 122.6 grams of this compound in the reaction zone. The mixture was then refluxed gently for 7 hours at a pot temperature of 140–144° C., after which time vapor phase chromatographic analysis of the sample showed a high conversion (estimated greater than 60 percent). The mixture was then cooled and allowed to stand over the weekend under nitrogen, after which the catalyst was hydrolyzed with methanol and the mixture was poured into water and extracted with pentane. The pentane extracts were washed with water, dried over magnesium sulfate, filtered and distilled. The results of this run are given below in Table I.

EXAMPLE XII

In this run, the reaction apparatus of the preceding Examples VIII–XI was employed. The flask was charged with 4.6 grams (0.2 gram atom) of sodium and 100 ml. of cis,cis-1,3-cyclooctadiene. The mixture was heated to 135° C., and a solution of 10.8 grams (0.1 mol) of anisole in 25 ml. of cis,cis-1,3-cyclooctadiene was added dropwise over 15 minutes. The total charge of cis,cis-1,3-cyclooctadiene was 108.5 grams. The mixture was heated at reflux with vigorous stirring for 18 hours at 142° C. with no apparent reaction. The sodium was not consumed, and the boiling point did not change. The mixture was then cooled to room temperature, and the sodium was destroyed with 100 ml. of absolute ethanol. The mixture was then poured into a large volume of water, the layers were separated, and the aqueous layer was extracted with n-pentane. The combined organic layers were washed thoroughly with water, dried overnight using magnesium sulfate, filtered, and distilled. There was obtained 95.6 grams of material boiling 132–148° C. with practically no residue. Vapor phase chromatographic analysis showed only cis,cis-1,3-cyclooctadiene with only a small amount of higher boiling material, probably cyclooctene. There was no evidence of cis-$\Delta^2$-bicyclo(3,3,0)octene in this run.

TABLE I

| Example No. | Catalyst | Time (hrs.) | Weight Percent | | |
|---|---|---|---|---|---|
| | | | Unconverted 1,3-COD [1] | Cis-$\Delta^2$-bicyclo 3,3,0-octene | Higher Boiling Materials |
| VIII | Phenylpotassium [2] | 20 | 38.8 | 31.3 | 16.2 |
| IX | Phenylpotassium [2] | 6 | 5.1 | 57.0 | 26.8 |
| X | Potassium | 7 | 4.7 | 61.7 | 25.5 |
| XI | Phenylsodium | 7 | 0.7 | 15.0 | 66.6 |
| XIII | Sodium | 18 | (3) | | |

[1] Cis,cis-1,3-cyclooctadiene.
[2] The phenylpotassium in Example VIII was prepared by the reaction of potassium and anisole, while the phenylpotassium in Example IX was prepared by the reaction of potassium and diphenylmercury.
[3] No reaction.

Vapor phase chromatographic analysis indicates that the materials higher boiling than $\Delta^2$-bicyclo-3,3,0-octene are made up of dimers, trimers, and some higher polymers. Vapor phase chromatographic analysis also indicates that the dimers are mixtures of three compounds as shown in the following Table II.

TABLE II

| Example No. | Composition of Dimers, Wt. Percent | | |
|---|---|---|---|
| | Compound I | Compound II | Compound III |
| VIII | 46.4 | 2.2 | 51.4 |
| IX | 69.4 | 11.2 | 14.8 |
| X | 79.6 | 0.6 | 20.0 |
| XI | 87.2 | 12.8 | Trace |

The cis-$\Delta^2$-bicyclo-3,3,0-octene products of Examples VIII–XII inclusive were identified by methods comparable to those described in the above Examples I–VII inclusive.

EXAMPLE XIII

A sample of the high boiling material from the above Example XI was quantitatively hydrogenated over platinum catalyst in methylcyclohexane. In this run the hydrogen absorption was equivalent to 2.20 double bonds per molecule (average of four analyses). As given below, these results show that Compound I of the above Table II is a diene.

A sample of the high boiling material from Example VIII was also quantitatively hydrogenated over platinum catalyst in methylcyclohexane. In this run the hydrogen absorption was equivalent to 2.48 double bonds per molecule. As given below, these results show that Compound II and Compound III of the above Table II are trienes.

As shown in the above Table II the high boiling material from Example XI contained 87.2 weight percent of said Compound I and 12.8 percent of said Compound II. These data, together wtih the hydrogen absorption value equivalent to 2.20 double bonds per molecule, are strong evidence that said Compound I is a diene. However, the following series of calculations set forth in Tables III and IV confirm that said Compound I is a diene. Said calculations are made on the basis that all of said Compounds I, II, and III are isomeric dimers having the empirical formula $C_{16}H_{24}$. Thus, weight percents and mol percents are interchangeable. The calculations in Table III below were made by the equation:

(mol percent I) (No. of double bonds in I) + (mol percent II) (No. of double bonds in II) = 2.20

TABLE III

| Assumed Double Bonds in I | Assumed Double Bonds in II | Calculated Double Bonds |
|---|---|---|
| 1 | 2 | 1.128 |
| 1 | 3 | 1.256 |
| 1 | 4 | 1.384 |
| 1 | 5 | 1.512 |
| 1 | 6 | 1.640 |
| 2 | 1 | 1.872 |
| 2 | 2 | 2.000 |
| 2 | 3 | 2.128 |
| 2 | 4 | 2.256 |
| 3 | 0 | 2.616 |
| 3 | 1 | 2.744 |
| 3 | 2 | 2.872 |

Similar calculations can be made for the high boiling material from the above Example VIII which was shown in Table II to contain 46.4 weight percent Compound I, 2.2 weight percent Compound II, and 51.4 weight percent Compound III. As set forth above, when this material was hydrogenated the hydrogen absorption was equivalent to 2.48 double bonds per molecule. The calculations given in Table IV below show that said Compounds II and III are trienes. Said calculations were made by the formula:

(mol percent I)(2) + (mol percent II) double bonds in II) + (mol percent III) double bonds in III) = 2.48

TABLE IV

| Double Bonds in I | Assumed Double Bonds in II | Assumed Double Bonds in III | Calculated Double Bonds |
|---|---|---|---|
| 2 | 2 | 1 | 1.486 |
| 2 | 2 | 2 | 1.990 |
| 2 | 2 | 3 | 2.514 |
| 2 | 2 | 4 | 3.028 |
| 2 | 3 | 1 | 1.574 |
| 2 | 3 | 2 | 2.088 |
| 2 | 3 | 3 | 2.602 |
| 2 | 3 | 4 | 3.116 |

A comparison of the calculations in the above Tables III and IV shows that the only possibility which can exist is for said Compound I to be a diene, and said Compounds II and III to be trienes.

EXAMPLE XIV

The 45 grams of high boiling material from the above Example V was distilled and there was obtained 38.2 grams of material boiling at 89 to 96° C. at 0.3 mm. Hg pressure. Gas-liquid chromatography analysis of this fraction showed that it contained 73 weight percent of Compound I, 6 weight percent of Compound II, and 21 weight percent of Compound III. Said fraction was hydrogenated over a platinum catalyst and the hydrogenated product separated by vapor phase chromatography into Compounds IV, V, and VI which are the hydrogenation products of said Compounds I, II, and III, respectively. Said Compounds IV, V, and VI were then analyzed on a mass spectrometer.

The cracking pattern of Compound IV showed a base peak at a $m/e$ ratio of 111 and other prominent peaks at 109, 69, 67, 55 and 41. In comparison, the predominant peaks in the cracking patterns of cyclooctane derivatives appear at $m/e$ values of 111, 69, 55, and 41, while those of cis-bicyclo-3,3,0-octane derivatives appear at 109, 67, 55, and 41. Thus, the structure of Compound IV is consistent with cyclooctyl-cis-bicyclo-3,3,0-octane.

The cracking pattern of Compound V showed a base peak at $m/e$ of 67, with other prominent peaks at 109, 81, 55, and 41, as well as several minor peaks separated by 14 mass numbers, indicating the loss of —$CH_2$— fragments as occur in a normal alkane. This pattern is consistent with Compound V being n-octyl-cis-bicyclo-3,3,0-octane.

The cracking pattern of Compound VI showed a major peak at $m/e$ 69 and prominent peaks at 111, 55, and 41, and lacked a strong 67 peak. These $m/e$ ratios are consistent with Compound VI being cyclooctylcyclooctane. To further check this proof, cyclooctylcyclooctane was synthesized by the reaction of cyclooctylbromide and magnesium. The synthesized material had a melting point of 9–10° C. and a refractive index $n_D^{20}$ 1.5020. This compares with the literature values melting point 10–11° C. and $n_D^{20}$ 1.5008 reported by A. C. Cope and D. J. Marshall, J. Am. Chem. Soc., 75, 3208 (1933). The mass cracking pattern and infrared spectrum of this synthesized material were identical to the mass cracking pattern and infrared spectrum of Compound VI.

While it is not intended to limit the invention by any theory of the reaction mechanism, the results of the above Examples I–XIV inclusive indicate that cis-$\Delta^2$-bicyclo-3,3,0-octene is formed by abstraction of an allylic proton from 1,3-cyclooctadiene which is charged as a reactant or which is formed by isomerization of 1,5-cyclooctadiene in situ. The carbanion formed by said proton abstraction, 1,3-cyclooctadienyl, adds trans-annularly to the end of the conjugated system, thus bridging the ring and forming the cis-$\Delta^2$-bicyclo-3,3,0-octenyl carbanion.

This last-mentioned carbanion adds a proton to form the product, cis-Δ²-bicyclo-3,3,0-octene, identified above.

The formation of the C₁₆ products according to this invention involves the addition of carbanions to conjugated unsaturation, which in itself is an alkylation reaction. Thus, the process of forming these C₁₆ products is referred to as an alkylation process, while the products are referred to as alkylate.

The results obtained also indicate that Compound I is formed by the addition of some of said cis-Δ²-bicyclo-3,3,0-octenyl carbanion to 1,3-cyclooctadiene in either 1,2 to 1,4 fashion. Compound I is thus 4-(2- and/or 3-cyclooctenyl)-cis-Δ²-bicyclo-3,3,0-octene.

The results obtained further indicate that Compound II is formed by intermolecular electron shift within some of the carbanions formed on said addition of the cis-Δ²-bicyclo-3,3,0-octenyl carbanion to 1,3-cyclooctadiene. This electron shift results in cleavage of the cyclooctene ring. The carbanion resulting from said cleavage adds a proton, and the product thus formed is 4-octadienyl-cis-Δ²-bicyclo-3,3,0-octene.

The results obtained also indicate that Compound III is formed by the addition of said 1,3-cyclooctadienyl carbanion to 1,3-cyclooctadiene, said addition again occurring in a 1,2 or 1,4 fashion. Compound III is thus 5-(2- and/or 3-cyclooctenyl)-1,3-cyclooctadiene.

Thus, the above results together with a knowledge of the type of reaction mechanism involved are consistent with the following structures for said Compounds I, II, and III.

I: 4-(2- and/or 3 - cyclooctenyl)-cis - Δ² - bicyclo-3,3,0-octene
II: 4-octadienyl-cis-Δ²-bicyclo-3,3,0-octene
III: 5-(2- and/or 3-cyclooctenyl)-1,3-cyclooctadiene When said Compounds I, II, and III are hydrogenated they become:

Compound IV 4-cyclooctyl-cis-bicyclo-3,3,0-octane
Compound V 4-n-octyl-cis-bicyclo-3,3,0-octane
Compound VI cyclooctylcyclooctane The products of this invention have a variety of uses. For example, cis-Δ²-bicyclo-3,3,0-octene can be hydrogenated to cis-bicyclo-3,3,0-octane, which is useful as a solvent, plasticizer, fuel, etc. Furthermore, oxidation of said products to dicarboxylic acids can be effected. Oxidation of cis-Δ²-bicyclo-3,3,0-octene yields cis-2-carboxycyclopentaneacetic acid. This diacid is useful in the formation of polyesters containing cyclopentane structures. The 16-carbon cyclic polyenes described herein are useful as high density fuels, and they can also be hydrogenated to the corresponding saturated 16-carbon hydrocarbons. These polyenes can be employed as drying oils, as comonomers in ethylene-propylene rubber to impart vulcanizability, as rubber modifiers and the like.

Although the process of the invention has been described as a batch operation, it will be apparent to those skilled in the art that a continuous system can be employed without deviating from the inventive concept disclosed herein.

While certain embodiments of the invention have been described for illustrative purposes, the invention obviously is not limited thereto. Various other modifications will be apparent to those skilled in the art in view of the above disclosure. Such modifications are within the spirit and scope of the invention.

I claim:
1. A process for isomerizing a cyclooctadiene to a cis-Δ²-bicyclo-3,3,0-octene containing the same number of carbon atoms and hydrogen atoms as said starting cyclooctadiene, which process comprises: contacting said cyclooctadiene under isomerizing conditions in an isomerization zone with an isomerization catalyst selected from the group consisting of elemental potassium, elemental rubidium, elemental cesium, and compounds characterized by the formula

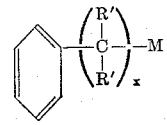

wherein: M is an alkali metal selected from the group consisting of potassium, sodium, cesium, and rubidium, $x$ is an integer of from 0 to 1, and each R' is selected from the group consisting of a hydrogen atom and a methyl group; and recovering said bicyclooctene.

2. The process of claim 1 wherein said cyclooctadiene is 1,3-cyclooctadiene and is contacted with said isomerization catalyst at a temperature within the range of from 125 to 250° C., and said catalyst is present in an amount within the range of from 1 to 15 weight percent of said starting cyclooctadiene.

3. The process of claim 1 wherein said cyclooctadiene is 1,5-cyclooctadiene and is contacted with said isomerization catalyst at a temperature within the range of from 125 to 250° C., and said catalyst is present in an amount within the range of from 1 to 15 weight percent of said starting cyclooctadiene.

4. A process for isomerizing a cyclooctadiene characterized by a formula selected from the group consisting of

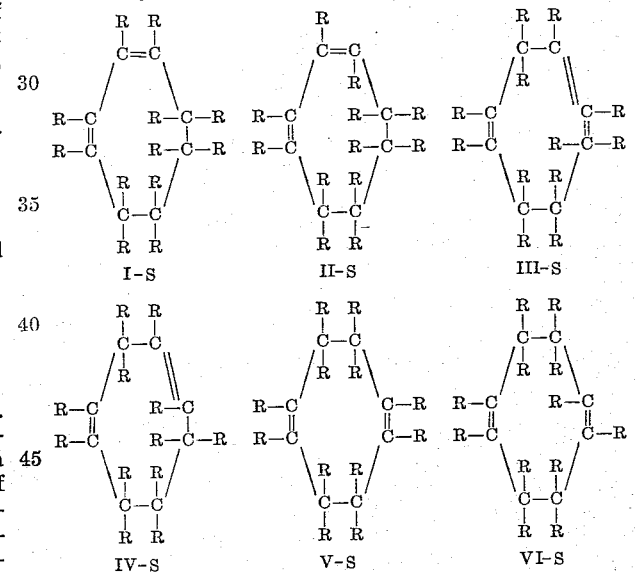

wherein: each R is selected from the group consisting of a hydrogen atom, and alkyl, aralkyl, alkaryl, and cycloalkyl radicals containing from 1 to 8 carbon atoms inclusive, at least 8 of said R substituents are hydrogen, and at least 1 of said R substituents is a hydrogen atom located in an allylic position, to a cis-Δ²-bicyclo-3,3,0-octene having the same number of carbon atoms and hydrogen atoms as said starting cyclooctadiene, which process comprises: contacting said cyclooctadiene in an isomerization zone at a temperature within the range of from 125 to 250° C., for a period of time within the range of from 1 to 50 hours, with an isomerization catalyst present in said zone in an amount within the range of from 1 to 15 weight percent of said starting cyclooctadiene; and recovering said bicyclooctene from the resulting mixture; said catalyst being selected from the group consisting of elemental potassium, elemental rubidium, elemental cesium, and compounds characterized by the formula

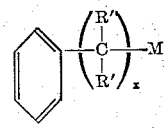

wherein: M is an alkali metal selected from the group consisting of potassium, sodium, cesium, and rubidium, $x$ is an integer of from 0 to 1, and each R' is selected from the group consisting of a hydrogen atom and a methyl group.

5. The process of claim 4 wherein said cyclooctadiene is 1,3-cyclooctadiene, and said catalyst is phenylpotassium.

6. The process of claim 4 wherein said cyclooctadiene is 1,5-cyclooctadiene, and said catalyst is phenylpotassium.

7. A process for the preparation of cis-Δ²-bicyclo-3,3,0-octene, which process comprises: forming a mixture containing elemental potassium, anisole, and cis,cis-1,5-cyclooctadiene in an isomerization zone; maintaining said mixture at a temperature within the range of from 125 to 250° C., with agitation, for a period of time within the range of from 1 to 50 hours; and recovering said cis-Δ²-bicyclo-3,3,0-octene from the resulting reaction mixture.

8. A process for the preparation of cis-Δ²-bicyclo-3,3,0-octene, which process comprises: forming a mixture containing elemental potassium, anisole, and cis,cis-1,3-cyclooctadiene in an isomerization zone; maintaining said mixture at a temperature within the range of from 125 to 250° C., with agitation, for a period of time within the range of from 1 to 50 hours; and recovering said cis-Δ²-bicyclo-3,3,0-octene from the resulting reaction mixture.

9. A process for the preparation of cis-Δ²-bicyclo-3,3,0-octene, which process comprises: forming a first mixture containing diphenylmercury, potassium metal, and an inert hydrocarbon diluent in an isomerization zone; adding cis,cis-1,3-cyclooctadiene to said first mixture to form a reaction mixture; maintaining said reaction mixture at a temperature within the range of from 125 to 250° C. for a period of time within the range of from 1 to 50 hours; and recovering said cis-Δ²-bicyclo-3,3,0-octene from the resulting reaction mixture.

10. A process for the preparation of cis-Δ²-bicyclo-3,3,0-octene, which process comprises: contacting cis,cis-1,3-cyclooctadiene with potassium metal isomerization catalyst, present in an amount within the range of from 1 to 15 weight percent of said cyclooctadiene, for a period of time within the range of from 1 to 50 hours, and at a temperature within the range of from 125 to 250° C.; and recovering said cis-Δ²-bicyclo-3,3,0-octene from the resulting reaction mixture.

11. A process for the preparation of cis-Δ²-bicyclo-3,3,0-octene which process comprises: contacting cis,cis-1,3-cyclooctadiene with phenylsodium isomerization catalyst, present in an amount within the range of from 1 to 15 weight percent of said cyclooctadiene, for a period of time within the range of from 1 to 50 hours, and at a temperature within the range of from 125 to 250° C.; and recovering said cis-Δ²-bicyclo-3,3,0-octene from the resulting reaction mixture.

12. 4-cyclooctyl-cis-bicyclo-3,3,0-octane.

13. 4-n-octyl-cis-bicyclo-3,3,0-octane.

14. A process for preparing at least one of a cis-Δ²-bicyclo-3,3,0-octene, a cyclooctenyl-cis-Δ²-bicyclo-3,3,0-octene, an octadienyl-cis-Δ²-bicyclo-3,3,0-octene, and a cyclooctenyl-1,3-cyclooctadiene, which process comprises: contacting a cyclooctadiene in a reaction zone under isomerizing and alkylation conditions with an isomerization and alkylation catalyst selected from the group consisting of elemental potassium, elemental rubidium, elemental cesium, and compounds characterized by the formula

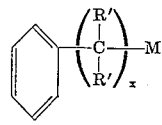

wherein: M is an alkali metal selected from the group consisting of potassium, sodium, cesium, and rubidium, $x$ is an integer of from 0 to 1, and each R' is selected from the group consisting of a hydrogen atom and a methyl group; and recovering said bicyclooctene; and recovering at least one of said cis-Δ²-bicyclo-3,3,0-octene, said cyclooctenyl-cis-Δ²-bicyclo-3,3,0-octene, said octadienyl-cis-Δ²-bicyclo-3,3,0-octene, and said cyclooctenyl-1,3-cyclooctadiene from the resulting reaction mixture.

15. The process of claim 14 wherein: said cyclooctadiene starting material is contacted with said catalyst at a temperature within the range of from 125 to 250° C., for a period of time within the range of from 1 to 50 hours, and said catalyst is present in an amount within the range of from 1 to 15 weight percent of said starting cyclooctadiene.

16. The process of claim 15 wherein said catalyst is phenylpotassium.

17. A 4-(cyclooctenyl)-cis-Δ²-bicyclo-3,3,0-octene product prepared by the process of claim 14.

18. A 4-octadienyl-cis-Δ²-bicyclo-3,3,0-octene prepared by the process of claim 14.

19. A 5-(cyclooctenyl)-1,3-cyclooctadiene product prepared by the process of claim 14.

References Cited

UNITED STATES PATENTS 3,124,621  3/1964  Crain et al. _____ 260—666

OTHER REFERENCES

Robert J. Sevenich, Dissertation Abstracts, 24(7)2698 1964 (Iowa State University, Ph.D. Dissertation 1963).

C. S. Foote and R. B. Woodward, UCLA, Tetrahedron 20(3), 687–715 (1964).

PAUL M. COUGHLAN, JR., *Primary Examiner.*

DELBERT E. GANTZ, *Examiner.*

V. O'KEEFE, *Assistant Examiner.*

UNITED STATES PATENT OFFICE
CERTIFICATE OF CORRECTION

Patent No. 3,363,016                                January 9, 1968

Paul R. Stapp

It is hereby certified that error appears in the above numbered patent requiring correction and that the said Letters Patent should read as corrected below.

Column 16, lines 27 to 38, the formula should appear as shown below instead of as in the patent:

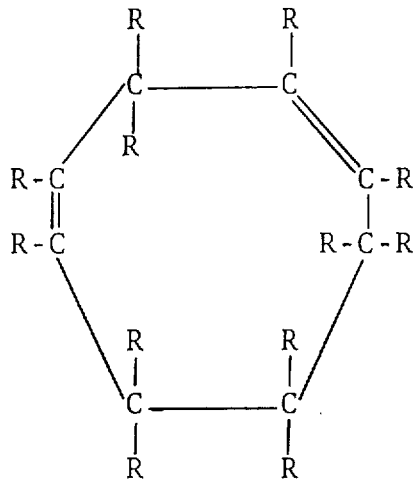

III-S

Signed and sealed this 15th day of April 1969.

(SEAL)
Attest:

EDWARD M. FLETCHER, JR.                          EDWARD J. BRENNER
Attesting Officer                                       Commissioner of Patents